(12) United States Patent
Machiraju et al.

(10) Patent No.: US 8,873,752 B1
(45) Date of Patent: Oct. 28, 2014

(54) DISTRIBUTED WIRELESS DEVICE ASSOCIATION WITH BASESTATIONS

(75) Inventors: Sridhar Machiraju, Burlingame, CA (US); Jean Bolot, Mountain View, CA (US); Hao Chen, Kensington, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1314 days.

(21) Appl. No.: 12/355,177

(22) Filed: Jan. 16, 2009

(51) Int. Cl.
*H04W 36/00* (2009.01)
*H04W 12/06* (2009.01)

(52) U.S. Cl.
CPC .............. *H04W 36/00* (2013.01); *H04W 12/06* (2013.01); *H04W 36/0083* (2013.01)
USPC ........... 380/247; 380/270; 380/272; 380/277; 370/331; 455/436

(58) Field of Classification Search
USPC ......................................................... 380/247
See application file for complete search history.

(56) References Cited

U.S. PATENT DOCUMENTS

| | | | | |
|---|---|---|---|---|
| 5,153,884 | A * | 10/1992 | Lucak et al. ................... | 714/748 |
| 6,370,380 | B1 * | 4/2002 | Norefors et al. .............. | 455/436 |
| 6,587,680 | B1 * | 7/2003 | Ala-Laurila et al. .......... | 455/411 |
| 6,651,105 | B1 * | 11/2003 | Bhagwat et al. .............. | 709/239 |
| 2002/0061748 | A1 * | 5/2002 | Nakakita et al. .............. | 455/435 |
| 2002/0114469 | A1 * | 8/2002 | Faccin et al. .................. | 380/270 |
| 2003/0018810 | A1 * | 1/2003 | Karagiannis et al. ......... | 709/238 |
| 2004/0106433 | A1 * | 6/2004 | Ooki et al. .................... | 455/561 |
| 2004/0236939 | A1 * | 11/2004 | Watanabe et al. ............. | 713/150 |
| 2008/0227452 | A1 * | 9/2008 | Sayeedi ........................ | 455/436 |
| 2009/0216906 | A1 * | 8/2009 | Weniger et al. ............... | 709/246 |

OTHER PUBLICATIONS

Captive Portal; http://en.wikipedia.org/wiki/Captive_portal, Jan. 15, 2009.
C. de Laat, G. Gross, L. Gommans, J. Vollbrecht, and D. Spence. Generic AAA Architecture, 2000. RFC 2903.
E. Griffith. Cost of Muni Wi-Fi is High, Jul. 2006; http://www.wi-fiplanet.com/news/article.php/3518071.
J .T. Kohl, B. Clifford Neuman, and T. Y. T'SO. The Evolution of the Kerberos Authentication System. In Proc. of Distributed Open Systems, 1994.
J. Larsen. Tackling Backhaul Costs, Jul. 2006. http://www.wirelessweek.com/article.aspx?id=112174.
W. Liang and W. Wang. A Lightweight Authentication Protocol with Local Security Association Control in Mobile Networks. In Proc. Of IEEE MILCOM, 2004.
W. Liang and W. Wang. A Quantitative Study of Authentication and QoS in Wireless IP Networks. In Proc. of IEEE INFOCOM, 2005.
A. Mishra, M. Shin, N. L. Petroni, Jr., T. C. Clancy, and W. Arbaugh. Pro-active Key Distribution Using Neighbor Graphs. Wireless Communications Magazine, Feb. 2004.
H. Moustafa, G. Bourdon, and Y. Gourhant. Authentication, Authorization and Accounting (AAA) in Hybrid Ad-hoc Hotspot's Environments. In Proc. of ACM Mobicom Workshop: WMASH, 2006.
W. Wang, W. Liang, and A. K. Agarwal. Integration of Authentication and Mobility Management in Third Generation and WLAN Data Networks. Wireless Communications and Mobile Computing, Sep. 2005.

* cited by examiner

*Primary Examiner* — Alexander Lagor (57) ABSTRACT

An embodiment of the invention is directed to associating a wireless device with a basestation. A connection request is received from the wireless device. The wireless device is authenticated to the basestation. A token-transfer-request message is received. The wireless device is associated with the basestation by transferring a token associated with the wireless device to the basestation.

19 Claims, 7 Drawing Sheets

DISTRIBUTED WIRELESS DEVICE ASSOCIATION WITH BASESTATIONS

INTRODUCTION

For wireless devices to access wireless networking resources, the wireless devices may first associate with a basestation that provides access to the network resources. During the association process, various mechanisms could be used to ensure only wireless devices that are authorized to access the wireless network are allowed to associate with basestations. Other mechanisms could be used to ensure that wireless devices associate with a single basestation at a time.

SUMMARY

Embodiments of the invention are defined by the claims below, not this summary. A high-level overview of various aspects of the invention is provided to introduce a selection of concepts that are further described below in the detailed description. This summary is not intended to identify key features or essential features of the claimed subject matter, nor is it intended to be used as an aid in isolation to determine the scope of the claimed subject matter.

Embodiments of the invention are related to associating a wireless device with a basestation. A connection request is received from the wireless device. The wireless device is authenticated to the basestation. A token-transfer-request message is received. The wireless device is associated with the basestation by transferring a token associated with the wireless device to the basestation.

According to an embodiment of the invention, a token associated with the wireless device is transferred to the basestation by sending a token-request message to a token-holding basestation, receiving a message containing the token, sending an acknowledgement to the token-holding basestation, and receiving an acknowledgement from the token-holding basestation.

BRIEF DESCRIPTION OF THE DRAWINGS

Illustrative embodiments of the invention are described in detail below with reference to the attached drawing figures, which are incorporated by reference herein and wherein.

DETAILED DESCRIPTION

The subject matter of the embodiment of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention are directed to associating a wireless device with a basestation. Associating a wireless device with a basestation can provide a means to ensure only authorized wireless devices have access to the resources provided by the basestation. Additionally, associating a wireless device with a basestation can ensure that the wireless device has a single point of access to the network associated with the basestation.

Basestations can provide wireless devices access to network resources by providing points of attachment to a wireless network. Such basestations may also provide a bridge between the wireless networks they support and wired networks, such as the Internet. According to various embodiments of the invention, basestations can support a number of different wireless technologies, including IEEE 802.11 compatible technologies (WiFi), third generation cellular technologies (3G), and Worldwide Interoperability for Microwave Access technologies (WiMAX).

Authentication can be a way to ensure only authorized wireless devices have access to the resources provided by a basestation. There are a variety of authentication mechanisms used in wireless networks. Some authentication mechanisms are centralized. These mechanisms rely on a centralized server that is queried to answer authentication requests. By way of example, WiFi basestations provide a number of centralized authentication mechanisms, such as Wi-Fi Protected Access 2 (WPA2). According to another embodiment of the invention, authentication mechanisms can be distributed, so that no central authority needs to be contacted to resolve authorization questions.

According to some embodiments of the invention, an authentication mechanism can use a key to authenticate a wireless device. Those skilled in the art will recognize that there are a number of key-based authentication algorithms that could be used to authenticate wireless devices. According to other embodiments of the invention, the wireless device can be authenticated by a username and password authentication algorithm.

A single point of access for each wireless device can be ensured through the use of a central controlling server, which dictates where wireless devices are to be connected to the network. According to an embodiment of the invention, a single point of access can be ensured in a distributed manner through the use of a token. Each wireless device can be assigned a single token. Wireless devices could then only be associated with a basestation that holds the token associated with the wireless device. Since there is only one token per wireless device, each wireless device could be associated with at most, one basestation.

According to some embodiments of the invention, a token could be assigned to a wireless device during a first initialization of the wireless device. According to another embodiment, a token could be assigned to a wireless device each time the wireless device is activated. Tokens could be revoked by sending a message to all basestations announcing the revocation in a distributed system. In a system with a central server, tokens could be easily revoked by that central server.

If a basestation currently holding a token associated with a wireless device cannot be reached in order to begin the transfer of the token, a new temporary token could be assigned to the wireless device to allow the wireless device to associate with a new basestation, in accordance with an embodiment. A "dirty bit" could be set on the token, informing the basestations that this new token is a temporary token. The token-holding basestation that was not capable of being contacted could be sent messages periodically in order to request the permanent token when the token-holding basestation becomes reachable. By way of example, the original, permanent token could be transferred to the new basestation, replacing the temporary token. As another example, the original, permanent token could be deleted and the temporary token could be made permanent. The "dirty bit" could also be deleted.

An embodiment of the invention is directed to computer-readable media storing computer-executable instructions for associating a wireless device with a basestation. A connection request is received from the wireless device. The wireless device is authenticated to the basestation. A token-transfer-request message is received. The wireless device is associated with the basestation by transferring a token associated with the wireless device to the basestation.

Another embodiment of the invention is directed to computer-readable media storing computer-executable instructions for associating a wireless device with a basestation. A connection request is sent to the basestation. The wireless device is authenticated to the basestation. A token-transfer-request message is sent to the basestation. The wireless device is associated with the basestation by transferring a token associated with the wireless device to the basestation.

A further embodiment of the invention is directed to computer-readable media storing computer-executable instructions for associating a wireless device with a basestation. A connection request is received from the wireless device. The wireless device is authenticated to the basestation. A token-transfer-request message is received. The wireless device is associated with the basestation by sending a token-request message to a token-holding basestation, receiving a message containing the token, sending an acknowledgement to the token-holding basestation, and receiving an acknowledgement from the token-holding basestation.

Figure 1:
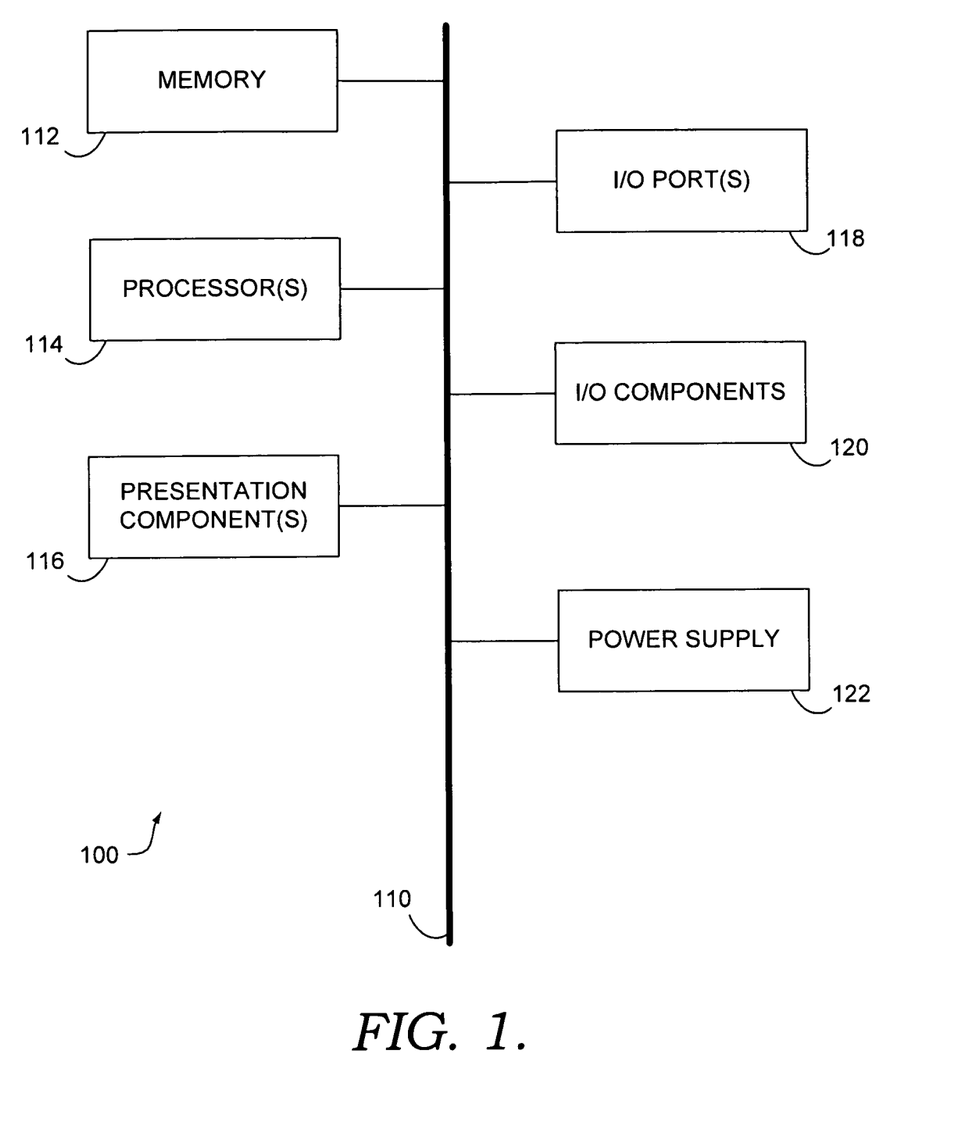
FIG. 1 depicts a block diagram of an exemplary computing environment suitable for implementing an embodiment of the invention.

Having briefly described an overview of embodiments of the invention, an exemplary operating environment in which embodiments of the invention may be implemented is described below. Referring initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the embodiment of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Some embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, Random-Access Memory (RAM), Read-Only Memory (ROM), Electrically-Erasable, Programmable, Read-Only Memory (EEPROM), flash memory or other memory technology, Compact Disk, Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. Memory 116 includes computer-storage media in the form of non-volatile memory. The memory 116 may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
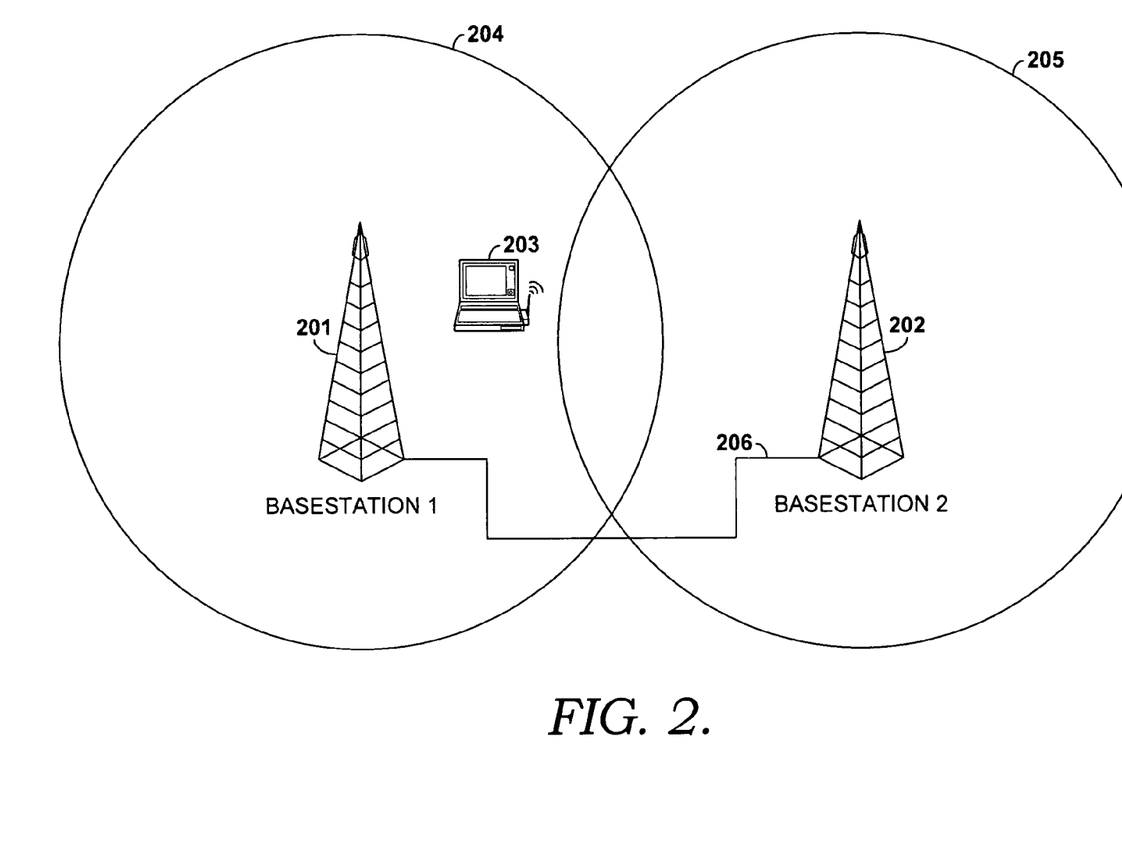
FIG. 2 depicts a block diagram of an exemplary network environment suitable for implementing an embodiment of the invention.

Referring to FIG. 2, a block diagram presenting a network suitable for implementing an embodiment of the invention is depicted. Wireless devices, such as wireless device 203, can access network resources, such as other devices on the Internet, through basestations 201, 202 providing gateways to those resources through a wireless link to each wireless device 203. To provide continuous coverage for a wireless device 203 moving in a region of space, the coverage areas 204, 205 of multiple basestations, such as basestation 201 and basestation 202 can be made to overlap. Basestation 201 can be connected to basestation 202 via a backhaul network connection 206. According to an embodiment of the invention, the backhaul network could be a wired network connection. By way of example, the backhaul network connection 206 could be a connect through the Internet over a variety of wired technologies (e.g., token ring and Ethernet).

According to an embodiment, each basestation 201 and 202 provides access to network resources to wireless devices, such as wireless device 203, through wireless connections. Those skilled in the art will recognize that there are a number of wireless technologies suitable for providing a wireless link (e.g., WiFi, WiMAX, and 3G technologies).

Associating a wireless device 203 with a basestation 201 can ensure a single point of connection to network resources. According to an embodiment of the invention, a token can be used to allow a wireless device 203 to connect to a basestation 201. Upon attempting to associate with a basestation 201, a token could be transferred from a previously associated basestation. The removal of the token from the previous basestation corresponding to a disassociation of the wireless device from that basestation.

Figure 3:
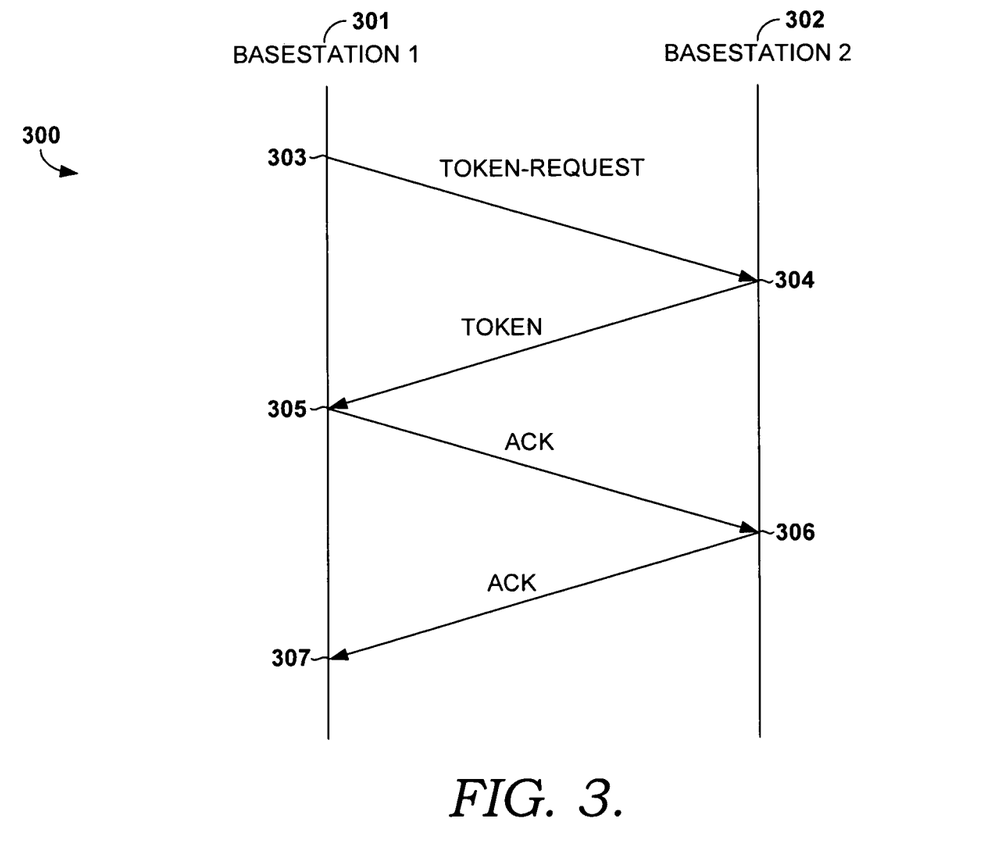
FIG. 3 depicts a timing diagram of a method of transferring a token, in accordance with an embodiment of the invention.

Referring now to FIG. 3, a basestation to which a wireless device wishes to associate transfers a token associated with that wireless device using the token transfer protocol depicted in the timing diagram 300. A first basestation 301 initiates a token transfer by sending a token-request message at time 303 to a second basestation 302. According to an embodiment of the invention, the first basestation 301 could be triggered to initiate a token transfer by a wireless device requesting access to network resources via the basestation 301. By way of example, a wireless device could attempt to associate with the basestation 301, in part, by informing the basestation 301 of the name of a token-holding basestation 302 that currently holds the token associated with the wireless device. Those skilled in the art will recognize that there are many ways in which the basestation 301 could be informed of which basestation is the token-holding basestation 302, for example, by IP address and by domain name (e.g., mail.domain.com). There are many formats in which the token-request message could be sent. By way of example, an encryption algorithm could be used to encrypt the contents of the token-request message.

Upon receiving the token-request message at time 304, the token-holding basestation 302 sends a message containing the token. According to an embodiment of the invention, the message containing the token could be encrypted. The token is received at time 305 by the basestation 301, which sends an acknowledgement, acknowledging the receipt of the token. By way of example, the acknowledgement could contain a unique identifier associated with the token-containing message.

At time 306 the acknowledgement sent by the basestation 301 is received by the token-holding basestation 302. The token-holding basestation 302 sends an acknowledgement, acknowledging the acknowledgement of the token-containing message to the basestation 301. At time 307 the basestation 301 receives the acknowledgement sent by the token-holding basestation 302.

According to some embodiments of the invention, the token-request message, the message containing the token, the acknowledgement acknowledging the token-containing message, and the acknowledgement acknowledging the acknowledgment of the token-containing message could be sent over a backhaul network.

According to another embodiment of the invention, the token-request message, the message containing the token, the acknowledgement acknowledging the token-containing message, and the acknowledgement acknowledging the acknowledgment of the token-containing message could be sent over wireless links, relayed by a wireless device that is within communication range of both the basestation and the token-holding basestation.

Figure 4:
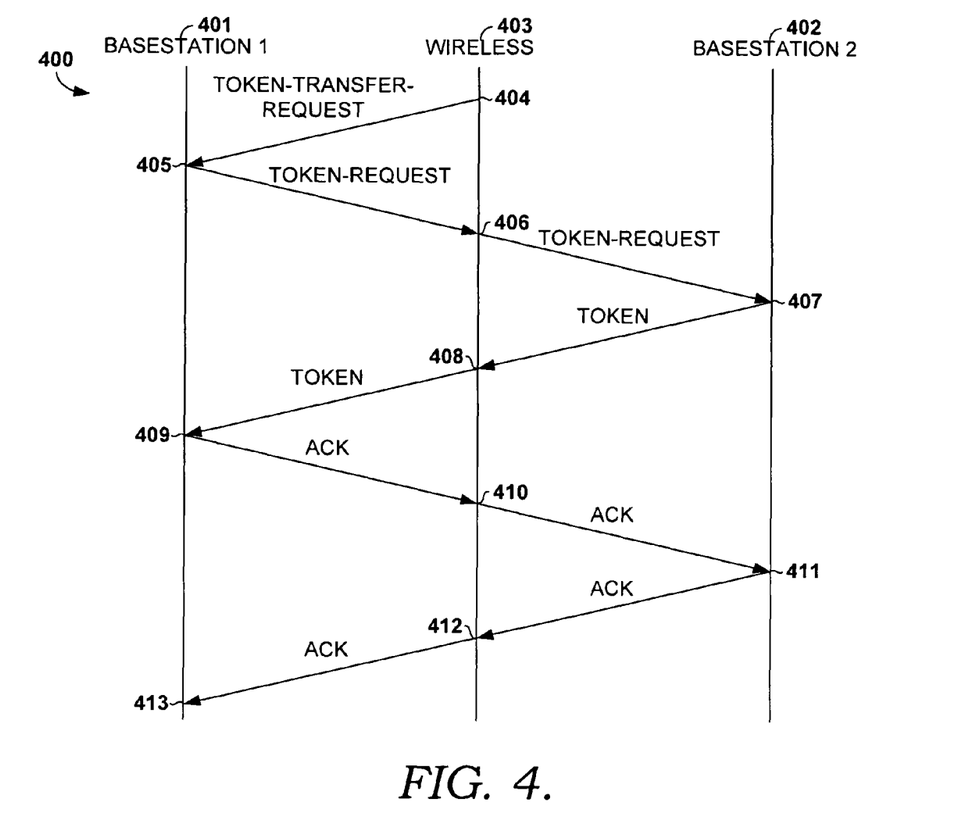
FIG. 4 depicts a timing diagram of a method of transferring a token via a wireless device, in accordance with an embodiment of the invention.

Referring now to FIG. 4, a wireless device 403 could send a token-transfer-request message to a basestation 401. The basestation 401 could be a basestation with which the wireless device 403 wishes to associate. The token-transfer-request message could contain an identifier of a token-holding basestation 402 that currently holds the token associated with the wireless device 403. At time 404, the wireless device 403 sends a token-transfer-request message to the basestation 401.

At time 405 the basestation 401 receives the token-transfer-request message. According to an embodiment of the invention, the basestation 401 could determine to send messages to the token-holding basestation 402, using the wireless device 403 as a relay. By way of example, the token-transfer-request message could contain information that the wireless device 403 is still in communication range of the token-holding basestation 402. The basestation 401 sends a token-request message addressed to the token-holding basestation 402 via the wireless device 403 at time 405. At time 406 the wireless device 403 receives the token-request message and forwards it to the token-holding basestation 402.

At time 407, the token-holding basestation 402 receives the token-request message and sends a token-containing message addressed to basestation 401 via the wireless device 403. The wireless device 403 receives the token-containing message at time 408 and forwards it to the basestation 401. At time 409, the basestation 401 receives the token-containing message and sends an acknowledgement acknowledging the token addressed to the token-holding basestation 402 via the wireless device 403.

At time 410, the wireless device 403 receives the acknowledgement acknowledging the token and forwards it to the token-holding basestation 402. The token-holding basestation 403 receives the acknowledgement sent by the basestation 401 at time 411 and sends an acknowledgement acknowledging the acknowledgement sent by the basestation 401 addressed to the basestation 401 via the wireless device 403. At time 412 the wireless device 403 receives the acknowledgement sent by the token-holding basestation 402 and forwards it to the basestation 401. At time 413 the acknowledgement sent by the token-holding basestation is received by the basestation 401.

According to some embodiments of the invention, the token-request message, the message containing the token, the acknowledgement acknowledging the token-containing message, and the acknowledgement acknowledging the acknowledgment of the token-containing message could be encrypted using a number of different encryption algorithms. By way of example, a public-key encryption algorithm could be used to encrypt the messages.

According to an embodiment of the invention, basestations could be in a number of states with respect to holding a token associated with a particular wireless device. By way of example, a basestation could be in a no-token state, where the basestation may have no information or token associated with the wireless device. The basestation could be in a with-token state, where the basestation has successfully acquired the token of the wireless device and may have stored it. In this state, the basestation may be able to associate with the wireless device or begin transferring the token to a different basestation. The basestation could be in a sending-token state, where the basestation has the token associated with the wireless device but is in the process of transferring it to a different basestation. The basestation could be in a receiving-token state, where the basestation is in the process of receiving the token associated with the wireless device but has not received the final acknowledgement from the token-sending basestation.

Figure 5:
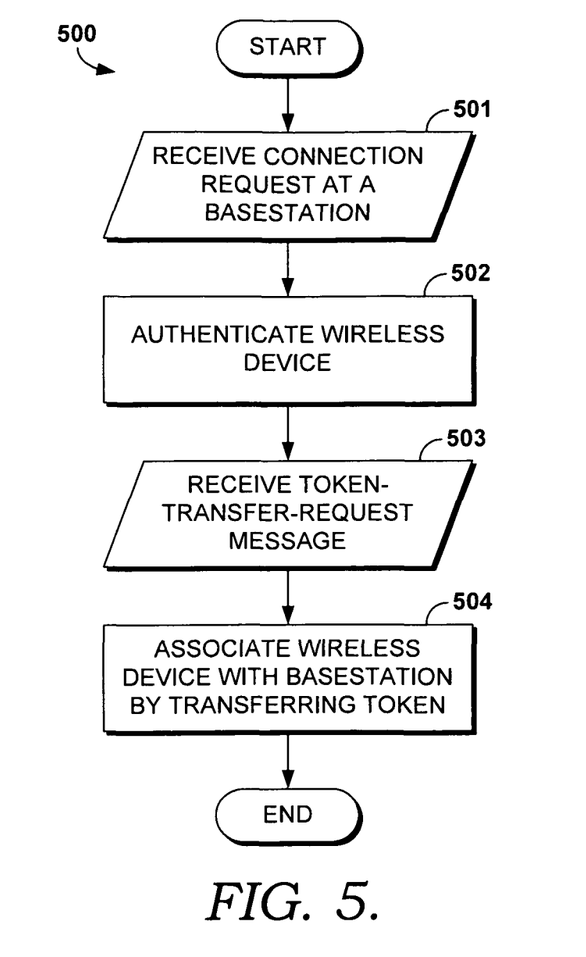
FIG. 5 is a flow diagram showing a method of associating a wireless device with a basestation, in accordance with an embodiment of the invention.

Turning now to FIG. 5, a flow diagram depicting a method 500 of associating a wireless device with a basestation is given. A connection request is received from a wireless device, as shown at block 501. The connection request could include different information about the wireless device. By way of example, the information could include an authentication key or username and password and a previously associated basestation name or address. The wireless device is authenticated, as shown at block 502. Authentication can provide a means to ensure that only authorized wireless devices are allowed to associated with a basestation. By way of example, a distributed key algorithm could be used to authenticate wireless devices. As another example, a username and password algorithm could be used to authenticate wireless devices.

A token-transfer-request message is received, as shown at block 503. According to an embodiment of the invention, the token-transfer request message can contain information about the basestation currently holding a token associated with the wireless device. Those skilled in the art will recognize that there are many other pieces of information that may be included in the token-transfer-request message. By way of example, the token-transfer-request message could contain information indicating that the wireless device is still in communication range of the basestation currently holding the token associated with the wireless device. According to an embodiment, the token-transfer-request message could be encrypted using an encryption algorithm. By way of example, the token-transfer-request message could be encrypted using a public-key encryption algorithm.

The wireless device is associated with the basestation by transferring the token associated with the wireless device from the basestation currently holding the token, as shown at block 504. According to an embodiment of the invention, the token is transferred across a backhaul network connecting the basestation with the token-holding basestation. According to another embodiment, the token is transferred across wireless links, relayed by the wireless device. Those skilled in the art will recognize that there are a number of mechanisms by which the token transfer could successfully take place.

Figure 6:
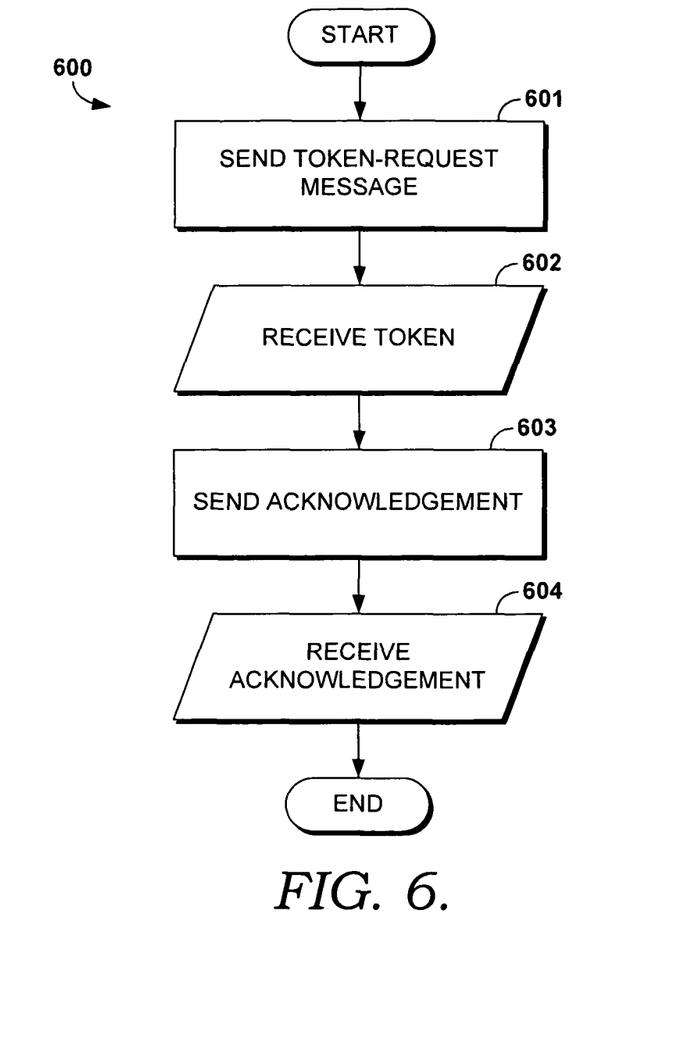
FIG. 6 is a flow diagram showing a method of transferring a token, in accordance with an embodiment of the invention.

Turning now to FIG. 6, a flow diagram is given depicting a method 600 of transferring a token from a token-holding basestation to a different basestation. A token-request message is sent by a basestation wishing to receive a token corresponding to a wireless device to the token-holding basestation, as shown at 601. According to some embodiments of the invention, the token-request message can be encrypted using an encryption algorithm (e.g., a public-key encryption algorithm). A message containing the requested token is received by the basestation, as shown at block 602. According to some embodiments of the invention, the message containing the token can be encrypted using an encryption algorithm. By way of example, the message containing the token could be encrypted using a public-key encryption algorithm.

An acknowledgement is sent by the basestation, acknowledging the receipt of the message containing the token, as shown at block 603. There are a number of ways the acknowledgement could identify the token it is associated with, including having the acknowledgement contain a unique identifier, identifying the message containing the token. According to an embodiment of the invention, the acknowledgement acknowledging the receipt of the token could be encrypted using an encryption algorithm (e.g., a public-key encryption algorithm). An acknowledgement is received, acknowledging the receipt of the acknowledgement acknowledging the token, as shown at block 604. There are a number of ways the acknowledgement could identify the token it is associated with, including having the acknowledgement contain a unique identifier, identifying the acknowledgement acknowledging the token. According to an embodiment of the invention, the acknowledgement acknowledging the receipt of the token could be encrypted using an encryption algorithm (e.g., a public-key encryption algorithm). According to an embodiment of the invention, the token-request message, the message containing the token, the acknowledgement acknowledging the receipt of the token, and the acknowledgement acknowledging the receipt of the acknowledgement acknowledging the token could be sent over a backhaul network.

Figure 7:
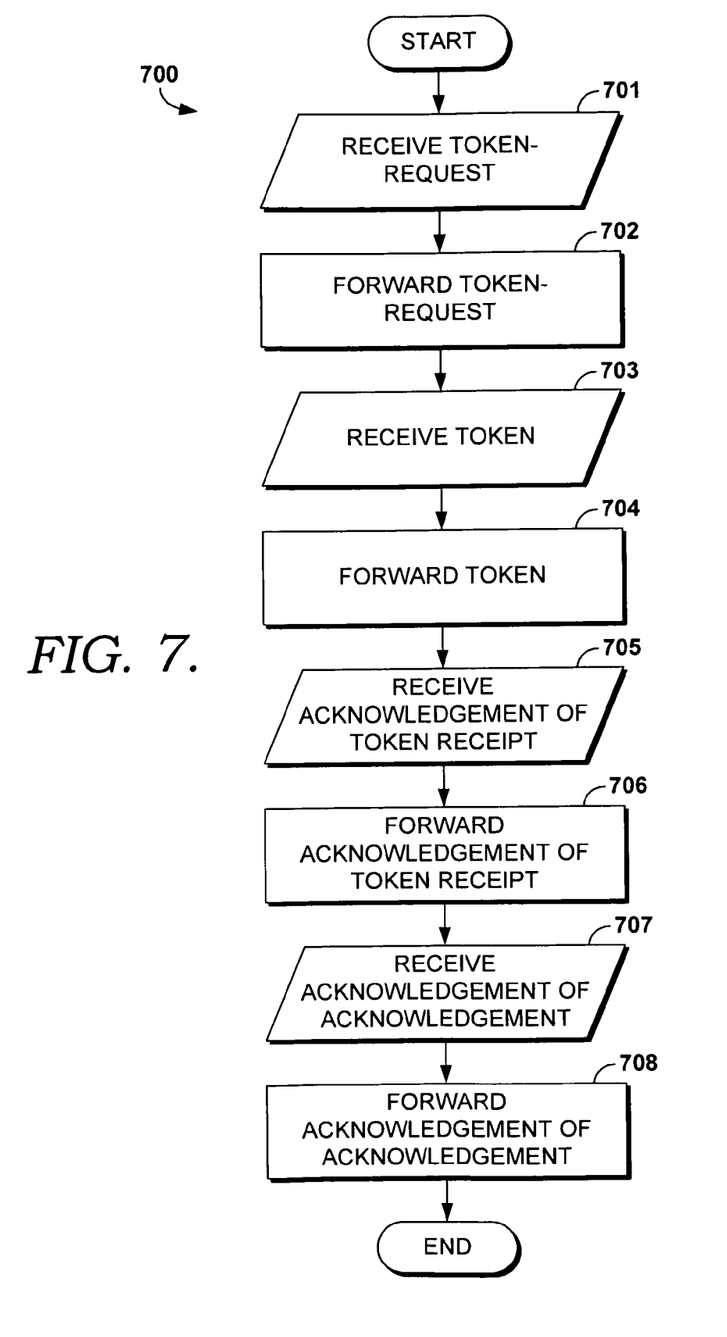
FIG. 7 is a flow diagram showing a method of transferring a token via a wireless device, in accordance with an embodiment of the invention.

Referring now to FIG. 7, a flow diagram depicting a method 700 of transferring a token from a token-holding basestation to a basestation is given. A token-request message is received from a basestation requesting a token, as shown at block 701. The token-request message can be similar to the token-request message discussed with reference to block 601 of FIG. 6. The token-request message could be addressed to a token-holding basestation currently holding the requested token. The token-request message is forwarded to the token-holding basestation, as shown at block 702.

A message containing the requested token, addressed to the requesting basestation, is received, as shown at block 703. The message containing the token can be similar to that discussed with reference to block 602 of FIG. 6. The message containing the token is forwarded to the basestation requesting the token, as shown at block 705. An acknowledgement acknowledging the receipt of the token is received, as shown at block 705. The acknowledgement acknowledging the receipt of the token can be similar to that discussed with reference to block 603 of FIG. 6.

The acknowledgment acknowledging the receipt of the token is forwarded to the basestation that sent the message containing the token, as shown at block 706. An acknowledgement acknowledging the receipt of the acknowledgement acknowledging the receipt of the token addressed to the basestation that requested the token is received, as shown at block 707. The acknowledgement addressed to the basestation that requested the token could be similar to that discussed with reference to block 604 of FIG. 6. The acknowledgement addressed to the basestation that requested the token is forwarded to the basestation that requested the token, as shown at block 708. According to an embodiment of the invention, all the messages transferred in the method 700 could be transferred across wireless links.

Many different arrangements of the various components depicted, as well as components not shown, are possible without departing from the spirit and scope of embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non transitory computer-readable media storing computer-executable instructions that, when executed by one or more processing devices, perform for performing a method of associating a wireless device with a first basestation, the method comprising:
- assigning a token to the wireless device, wherein the token is held by a basestation, wherein the token is transferable from one basestation to another basestation, wherein the token is held by only one basestation at a time, and wherein the token identifies the basestation that holds the token as a single point of access to network resources for the wireless device, such that the wireless device only accesses the network resources by way of the basestation that holds the token;
- at the first basestation, receiving a connection request from the wireless device, wherein the wireless device is already connected to a second basestation, wherein the second basestation to which the wireless device is already connected holds the token assigned to the wireless device and provides the single point of access to the network resources for the wireless device;
- authenticating the wireless device at the first basestation, wherein the authenticating is not performed by a central server;
- at the first basestation, subsequent to authenticating the wireless device, receiving a token-transfer-request message from the wireless device, wherein the token-transfer-request message is a request for the first basestation to obtain the token from the second basestation that holds the token; and
- transferring the token assigned to the wireless device from the second basestation to the first basestation, comprising
  - A) sending a token-request message to the second basestation, requesting the token be transferred,
  - B) receiving a message containing the token from the second basestation,
  - C) sending an acknowledgment to the second basestation, acknowledging the receipt of the token, and
  - D) receiving an acknowledgement, acknowledging the receipt of the acknowledgment acknowledging the receipt of the token,
- wherein the first basestation provides the single point of access to the network resources for the wireless device by virtue of holding the token, and wherein the second basestation is no longer a point of access to the network resources for the wireless device because the second basestation no longer holds the token;
- wherein transferring the token assigned to the wireless device to the first basestation comprises assigning the wireless device a temporary token when communication with the second basestation currently holding the token cannot be achieved.

2. The media of claim 1, wherein authenticating the wireless device comprises authenticating with a public-key encryption algorithm.

3. The media of claim 1, wherein authenticating the wireless device comprises authenticating with a username and password algorithm.

4. The media of claim 1, wherein the token-transfer-request message comprises an identifier of the second basestation currently holding the token associated with the wireless device.

5. The media of claim 1, wherein the transferring the token associated with the wireless device comprises transferring the token across a backhaul network.

6. The media of claim 5, wherein the backhaul network is a wired network.

7. The media of claim 4, wherein the token request message is encrypted.

8. The media of claim 4, wherein the message containing the token is encrypted.

9. One or more non transitory computer-readable media storing computer-executable instructions that, when executed by one or more processing devices, perform a method of associating a wireless device with a first basestation, the method comprising:
- from the wireless device, sending a connection request to the first basestation, wherein the wireless device is currently associated with a second basestation, wherein the second basestation holds a permanent token assigned to the mobile device while the wireless device is associated with the second basestation, and wherein removal of the token from the second basestation corresponds to a disassociation of the wireless device from the second basestation;
- authenticating the wireless device to the first basestation, wherein the authenticating is not performed by a central server;
- from the wireless device, sending a token-transfer-request message to the first basestation; and
- associating the wireless device with the first basestation by transferring the token associated with the wireless device to the first basestation from the second basestation, comprising
  - A) sending a token-request message to the second basestation, requesting the token be transferred,
  - B) receiving a message containing the token from the second basestation,
  - C) sending an acknowledgment to the second basestation, acknowledging the receipt of the token, and
  - D) receiving an acknowledgement, acknowledging the receipt of the acknowledgment acknowledging the receipt of the token,
- wherein the token is held by only one basestation at a time, and wherein the token identifies the basestation that holds the token as a single point of access to network resources for the wireless device;
- wherein when communication with the second basestation currently holding the token cannot be achieved, a temporary token is associated with the wireless device.

10. The media of claim 9, wherein the token-transfer-request message comprises an identifier of the second basestation currently holding the token associated with the wireless device.

11. The media of claim 10, wherein the transferring the token associated with the wireless device to the first basestation comprises:
- receiving a token-request message addressed to the second basestation from the basestation;
- forwarding the token-request message to the second basestation;

receiving a message containing the token addressed to the first basestation from the second basestation;

forwarding the message containing the token to the first basestation;

receiving an acknowledgement, acknowledging the receipt of the token addressed to the second basestation from the first basestation;

forwarding the acknowledgement, acknowledging the receipt of the token to the second basestation;

receiving an acknowledgement, acknowledging the receipt of the acknowledgement acknowledging the receipt of the token addressed to the first basestation from the second basestation; and forwarding the acknowledgement, acknowledging the receipt of the acknowledgement acknowledging the receipt of the token to the first basestation.

12. The media of claim 11, wherein the transferring the token associated with the wireless device further comprises transferring the token across a wireless network.

13. The media of claim 11, wherein the token-request message is encrypted.

14. The media of claim 11, wherein the message containing the token is encrypted.

15. The media of claim 9, wherein the transferring the token associated with the wireless device to the first basestation comprises assigning the wireless device a temporary token when communication with the second basestation currently holding the token cannot be achieved.

16. A method of associating a wireless device with a first basestation, comprising:

receiving a connection request from the wireless device;

authenticating the wireless device, wherein the authenticating is not performed by a central server;

receiving a token-transfer-request message containing an identifier of a second basestation currently holding a token associated with the wireless device, wherein the token is held by only one basestation at a time, and wherein the token identifies the basestation that holds the token as a single point of access to network resources for the wireless device; and associating the wireless device with the first basestation such that the first basestation is identified as the single point of access for the wireless device by A) sending a token-request message to the second basestation, requesting the token be transferred, B) receiving a message containing the token from the second basestation, C) sending an acknowledgment to the second basestation, acknowledging the receipt of the token, and D) receiving an acknowledgement, acknowledging the receipt of the acknowledgment acknowledging the receipt of the token;

wherein when communication with the second basestation currently holding the token cannot be achieved, a temporary token is associated with the wireless device.

17. The method of claim 16, wherein authenticating the wireless device comprises authenticating with a public-key encryption algorithm.

18. The method of claim 16, wherein the token request message is encrypted.

19. The method of claim 16, wherein the message containing the token is encrypted.

* * * * *